United States Patent
Chitty et al.

(10) Patent No.: US 11,533,235 B1
(45) Date of Patent: Dec. 20, 2022

(54) ELECTRONIC SYSTEM FOR DYNAMIC PROCESSING OF TEMPORAL UPSTREAM DATA AND DOWNSTREAM DATA IN COMMUNICATION NETWORKS

(71) Applicant: BANK OF AMERICA CORPORATION, Charlotte, NC (US)

(72) Inventors: Saisrikanth Chitty, Telangana (IN); Mukesh Katare, Telangana (IN); Vinod Maghnani, Haryana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/357,609

(22) Filed: Jun. 24, 2021

(51) Int. Cl.
*H04L 41/0893* (2022.01)
*H04L 41/084* (2022.01)
*H04L 67/1097* (2022.01)
*H04L 67/1095* (2022.01)

(52) U.S. Cl.
CPC ...... *H04L 41/0893* (2013.01); *H04L 41/0846* (2013.01); *H04L 67/1095* (2013.01); *H04L 67/1097* (2013.01)

(58) Field of Classification Search
CPC ................. H04L 41/0893; H04L 67/1097
See application file for complete search history.

(56) References Cited

U.S. PATENT DOCUMENTS

| | | |
|---|---|---|
| 8,069,188 B2 | 11/2011 | Larson et al. |
| 8,326,848 B2 | 12/2012 | Dettinger et al. |
| 8,583,769 B1 * | 11/2013 | Peters ............... G06F 16/256 |
| | | 709/221 |
| 8,677,091 B2 | 3/2014 | Littlefield et al. |
| 8,700,577 B2 | 4/2014 | Yeh et al. |
| 9,251,490 B2 | 2/2016 | Rallapalli et al. |
| 9,529,785 B2 | 12/2016 | Vagell et al. |
| 9,686,086 B1 | 6/2017 | Nguyen et al. |
| 9,864,751 B2 | 1/2018 | Halberstadt et al. |
| 10,110,390 B1 | 10/2018 | Nguyen et al. |
| 10,810,316 B2 | 10/2020 | Gordon et al. |
| 10,824,619 B2 | 11/2020 | Mackenthun et al. |
| 10,929,417 B2 | 2/2021 | Greene et al. |

(Continued)

FOREIGN PATENT DOCUMENTS

WO    2007038231 A2    4/2007

*Primary Examiner* — Viet D Vu
(74) *Attorney, Agent, or Firm* — Moore & Van Allen PLLC; Vaidehi Bachoti

(57) ABSTRACT

Embodiments of the invention are directed to systems, methods, and computer program products for dynamic processing of temporal upstream data and downstream data in communication networks. The invention is configured for dynamic processing and cascading of instance data and configuration files from edge node devices of a distributed network for reduction of latency in data transmissions. The invention involves constructing a first device cluster comprising one or more first cluster edge computing nodes of a plurality of edge computing nodes. In response to receiving a first downstream request for determining a current modification to the first source instance data, embodiments of the invention involves extracting at least one cluster configuration file associated with the at least one cluster edge computing node associated with first edge computing node, and processing the first technology application therewith.

18 Claims, 6 Drawing Sheets

(56) References Cited

U.S. PATENT DOCUMENTS

| | | |
|---|---|---|
| 2005/0256890 A1 | 11/2005 | Rajasekaran et al. |
| 2009/0063534 A1 | 3/2009 | Halberstadt |
| 2010/0114628 A1 | 5/2010 | Adler et al. |
| 2011/0066602 A1 | 3/2011 | Studer et al. |
| 2012/0102007 A1 | 4/2012 | Ramasubramanian et al. |
| 2013/0031044 A1 | 1/2013 | Miranda et al. |
| 2013/0138739 A1 | 5/2013 | Uppal |
| 2014/0082126 A1* | 3/2014 | Kim ........................ G06F 21/10 709/213 |
| 2014/0181085 A1 | 6/2014 | Gokhale et al. |
| 2018/0336027 A1* | 11/2018 | Narayanan ............ G06F 9/5072 |
| 2021/0012025 A1* | 1/2021 | Balasubramanian ........................ G06F 21/6227 |

* cited by examiner

ELECTRONIC SYSTEM FOR DYNAMIC PROCESSING OF TEMPORAL UPSTREAM DATA AND DOWNSTREAM DATA IN COMMUNICATION NETWORKS

BACKGROUND

Processing of electronic data files typically involves multiple processing stages. Systems for high volume data processing require multiple edge nodes and applications across various platforms running in order to implement the processing stages of electronic data. Moreover, processing of applications at downstream systems requires source data from upstream systems. However, downstream systems typically need to wait for upstream systems to provide the details on current source data and current changes to the data, e.g., through some mapping documents and/or the like. Due to inherent delays in data transmissions and utilizations of prior source data that is not current and incompatible with the application in real time, downstream systems may have undesirable failed processes and delayed processing. Moreover, conventional systems are not capable of dynamic data processing based on dynamic features like network and CPU utilization while identifying the real time object changes, file changes and reports mechanism on various source systems for cascading the changes to downstream systems. Therefore, a need exists for novel network architectures that provide dynamic processing of temporal upstream data and downstream data in communication networks.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention comprise systems, methods, and computer program products that address these and/or other needs by providing an innovative system, method and computer program product for dynamic processing of temporal upstream data and downstream data in communication networks. The system is configured for dynamic processing and cascading of instance data and configuration files from edge node devices of a distributed network for reduction of latency in data transmissions. Typically the system comprises: an entity communication network comprising a plurality of network nodes, wherein the plurality of network nodes comprise a plurality of edge computing nodes, wherein each of the plurality of edge computing nodes are associated with dynamic instance data generated by an associated user; one or more cluster processor devices; at least one downstream system; at least one memory device with computer-readable program code stored thereon; at least one communication device; at least one processing device operatively coupled to the plurality of network nodes, one or more cluster processor devices and the at least one downstream system, the at least one memory device and the at least one communication device. Executing the computer-readable code is configured to cause the at least one processing device to: construct a first device cluster comprising one or more first cluster edge computing nodes of the plurality of edge computing nodes, wherein each of the one or more first cluster edge computing nodes are associated with first source instance data; construct a second device cluster comprising one or more second cluster edge computing nodes of the plurality of edge computing nodes, wherein each of the one or more second cluster edge computing nodes are associated with second source instance data; determine initiation of processing of a first technology application at the at least one downstream system, wherein the processing of the first technology application is associated with an input of first source instance data associated with a first edge computing node of the plurality of edge computing nodes; receive a first downstream request for determining a current modification to the first source instance data associated with the first edge computing node; determine at least one cluster edge computing node associated with the first edge computing node, such that the first edge computing node and the at least one cluster edge computing node are associated with the same device cluster of the of the plurality of edge computing nodes; extract at least one cluster configuration file associated with the at least one cluster edge computing node; in response to determining a match of at least a portion of the first downstream request and the at least one cluster configuration file associated with the at least one cluster edge computing node, extract cluster metadata associated with the at least one cluster configuration file associated with the at least one cluster edge computing node; transform, via an extensible markup language connection device, the extracted cluster metadata associated with the at least one cluster edge computing node to application input data, such that application input data is compatible with the at least one downstream system; transmit the application input data to the at least one downstream system; and process the first technology application at the at least one downstream system using the application input data.

In some embodiments, or in combination with any of the previous embodiments, constructing the first device cluster further comprises: analyzing the source instance data associated with each of the plurality of edge computing nodes; determining the one or more first cluster edge computing nodes of the plurality of edge computing nodes as the first device cluster, in response to determining that a match associated with at least a portion of source instance data associated with each of the plurality of edge computing nodes; and assigning a first cluster processor device of the one or more cluster processor devices to the first device cluster such that the first cluster processor device is operatively coupled to each of the one or more first cluster edge computing nodes of the first device cluster.

In some embodiments, or in combination with any of the previous embodiments, constructing the second device cluster further comprises: analyzing the source instance data associated with each of the plurality of edge computing nodes; determining the one or more second cluster edge computing nodes of the plurality of edge computing nodes as the second device cluster, in response to determining that a match associated with at least a portion of source instance data associated with each of the plurality of edge computing nodes; and assigning a second cluster processor device of the one or more cluster processor devices to the second device cluster such that the second cluster processor device is operatively coupled to each of the one or more second cluster edge computing nodes of the second device cluster.

In some embodiments, or in combination with any of the previous embodiments, determining the at least one cluster edge computing node associated with the first edge computing node further comprises: determining that the first edge computing node is associated with the first device cluster, wherein the first edge computing node is one of the one or more first cluster edge computing nodes; determining the one or more first cluster edge computing nodes of the plurality of edge computing nodes associated with the first device cluster; and determining one or more of the one or more first cluster edge computing nodes that are not the first edge computing node as the at least one cluster edge computing node.

In some embodiments, or in combination with any of the previous embodiments, executing the computer-readable code is configured to further cause the at least one processing device to: extract, via the first edge computing node, a first configuration file associated with the first edge computing node; and in response to determining a match of at least a portion of the first downstream request and the first configuration file associated with the first edge computing node, extract first metadata associated with the first configuration file.

In some embodiments, or in combination with any of the previous embodiments, executing the computer-readable code is configured to further cause the at least one processing device to: analyze the extracted first metadata associated with the first configuration file; determine (i) a mismatch between the extracted first metadata and the first technology application, and/or determine that (ii) the extracted first metadata is not associated with modification to the first source instance data associated with the first edge computing node; and determine the at least one cluster edge computing node associated with the first edge computing node in response to determining (i) the mismatch between the extracted first metadata and the first technology application, and/or determining that (ii) the extracted first metadata is not associated with modification to the first source instance data associated with the first edge computing node.

In some embodiments, or in combination with any of the previous embodiments, executing the computer-readable code is configured to further cause the at least one processing device to: transform, via the extensible markup language connection device, the extracted first metadata associated with the first edge computing node to the application input data.

In some embodiments, or in combination with any of the previous embodiments, executing the computer-readable code is configured to further cause the at least one processing device to: transmit, from the at least one cluster edge computing node, the cluster metadata associated with the at least one cluster configuration file to the first edge computing node; and augment, via the first edge computing node, a first configuration file associated with the first edge computing node with the cluster metadata associated with the at least one cluster configuration file associated with the at least one cluster edge computing node.

In some embodiments, or in combination with any of the previous embodiments, the first edge computing node is one of the one or more first cluster edge computing nodes of the first device cluster, the at least one cluster edge computing node is one or more of the one or more first cluster edge computing nodes of the first device cluster. Here, executing the computer-readable code is configured to further cause the at least one processing device to: transmit, from the at least one cluster edge computing node, the cluster metadata associated with the at least one cluster configuration file to a third edge computing node of the one or more first cluster edge computing nodes of the first device cluster; and augment, via the first edge computing node, a third configuration file associated with the third edge computing node with the cluster metadata associated with the at least one cluster configuration file associated with the at least one cluster edge computing node.

In some embodiments, or in combination with any of the previous embodiments, determining the match of at least a portion of the first downstream request and the at least one cluster configuration file further comprises determining the match between at least one of a table, a view and/or a column associated with the first downstream request and the at least one cluster configuration file.

In some embodiments, or in combination with any of the previous embodiments, determining the match of at least a portion of the first downstream request and the at least one cluster configuration file further comprises determining a partial match between at least one of a table, a view and/or a column associated with the first downstream request and the at least one cluster configuration file. Here, executing the computer-readable code is configured to further cause the at least one processing device to: determine a related data component of the at least one cluster configuration file based on analyzing the at least one cluster configuration file associated with the at least one cluster edge computing node. Here, the extracted cluster metadata is associated with the related data component of the at least one cluster configuration file.

In some embodiments, or in combination with any of the previous embodiments, the first edge computing node is one of the one or more first cluster edge computing nodes of the first device cluster, the at least one cluster edge computing node is one or more of the one or more first cluster edge computing nodes of the first device cluster. Here, executing the computer-readable code is configured to further cause the at least one processing device to: augment, a first cluster processor configuration file associated with a first cluster processor device of the one or more cluster processor devices operatively coupled to each of the one or more first cluster edge computing nodes of the first device cluster.

In some embodiments, or in combination with any of the previous embodiments, executing the computer-readable code is configured to further cause the at least one processing device to: receive a second downstream request from the at least one downstream system for determining a current modification to a second source instance data associated with a second edge computing node, wherein the second edge computing node is associated with the second device cluster; determine at least one second cluster edge computing node associated with the second edge computing node, wherein the at least one second cluster edge computing node is associated with the second device cluster; extract at least one second cluster configuration file associated with the at least one second cluster edge computing node; and in response to not determining a match of at least a portion of the second downstream request and the at least one second cluster configuration file associated with the at least one second cluster edge computing node, operatively connect the at least one downstream system to the second edge computing node.

In some embodiments, or in combination with any of the previous embodiments, executing the computer-readable code is configured to further cause the at least one processing device to: receive a third downstream request from the at least one downstream system for determining a current modification to the first source instance data associated with the first edge computing node, wherein the first edge computing node is associated with the first device cluster; in response to determining a match of at least a portion of the third downstream request and the at least one first cluster configuration file associated with the first cluster edge computing node, extract cluster processor metadata associated with a first cluster processor configuration file associated with a first cluster processor device of the one or more cluster processor devices operatively coupled to each of the one or more first cluster edge computing nodes of the first device cluster; transform, via an extensible markup language connection device, the extracted cluster processor metadata to additional application input data, such that additional application input data is compatible with the at least one downstream system; transmit the additional application input data to the at least one downstream system; and process the first technology application at the at least one downstream system using the additional application input data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
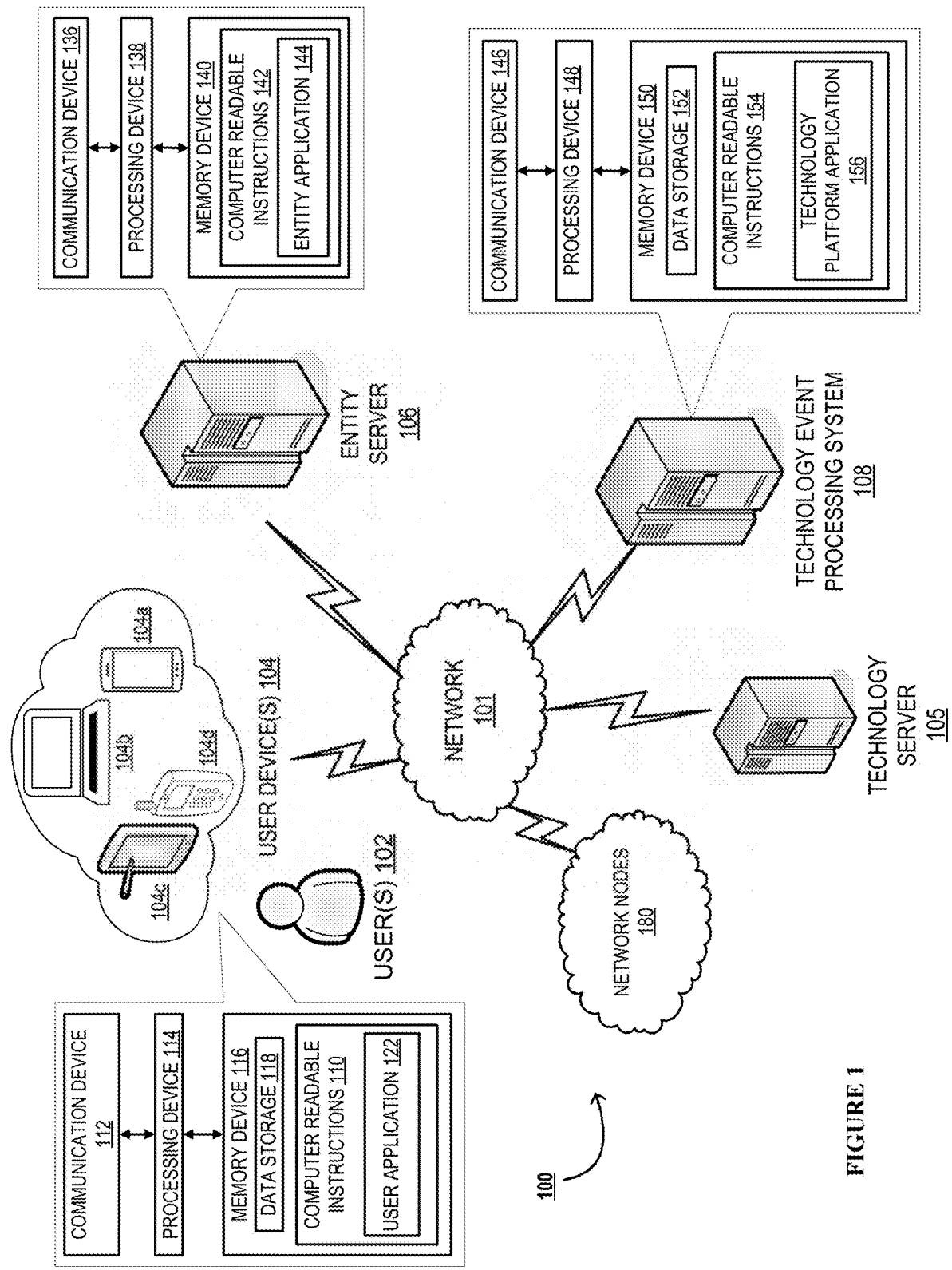
Figure 2:
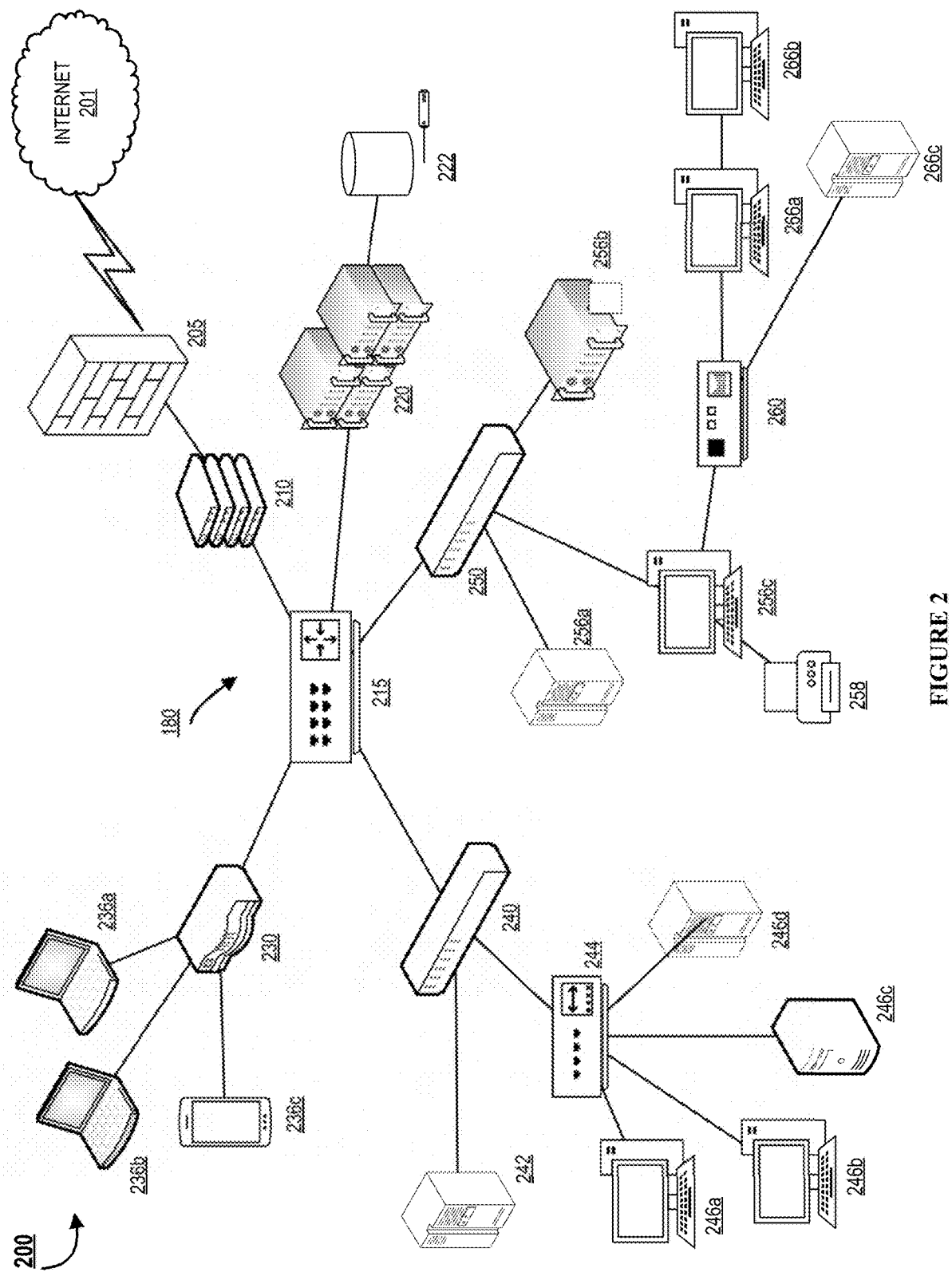
Figure 3A:
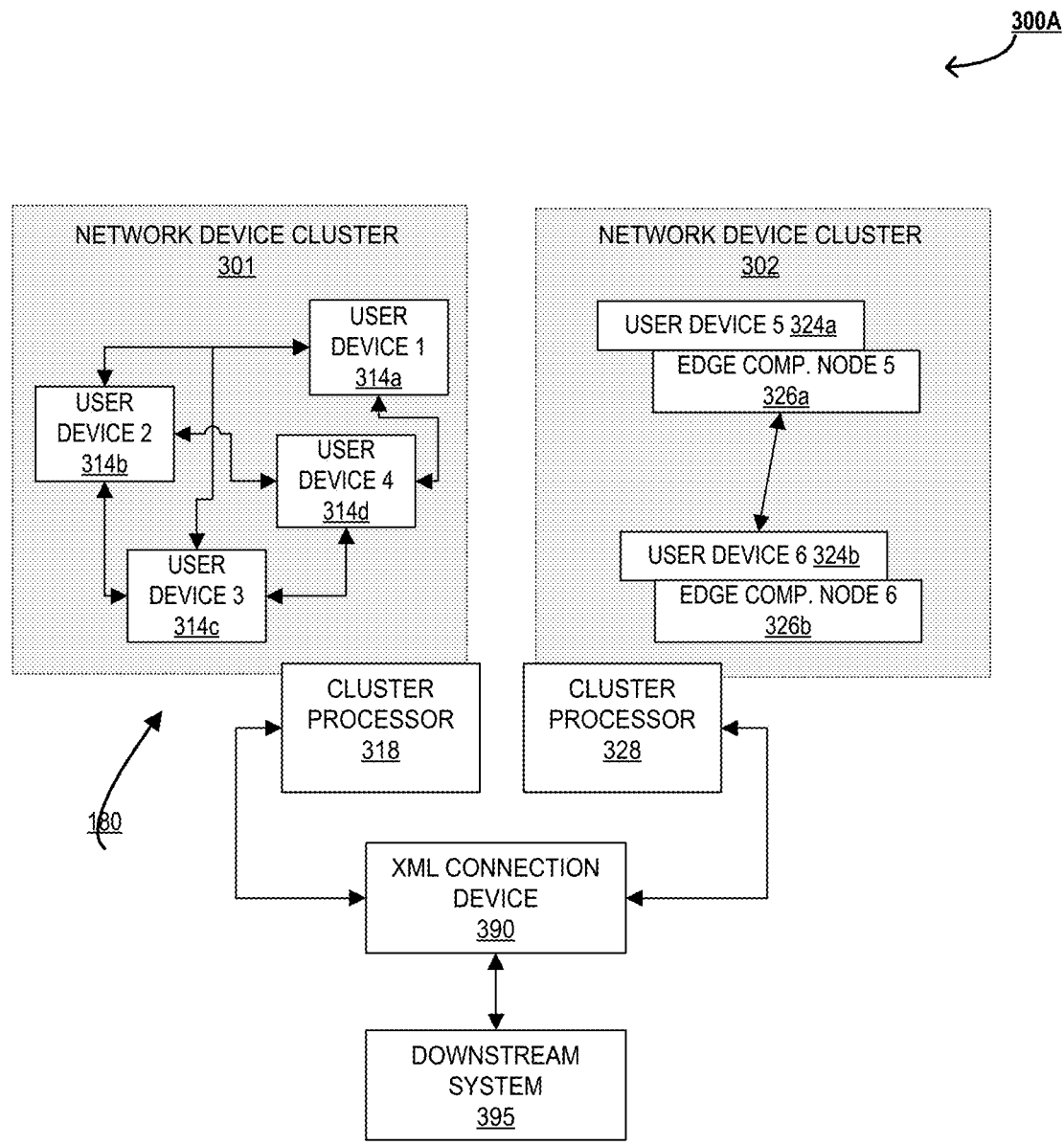
Figure 3B:
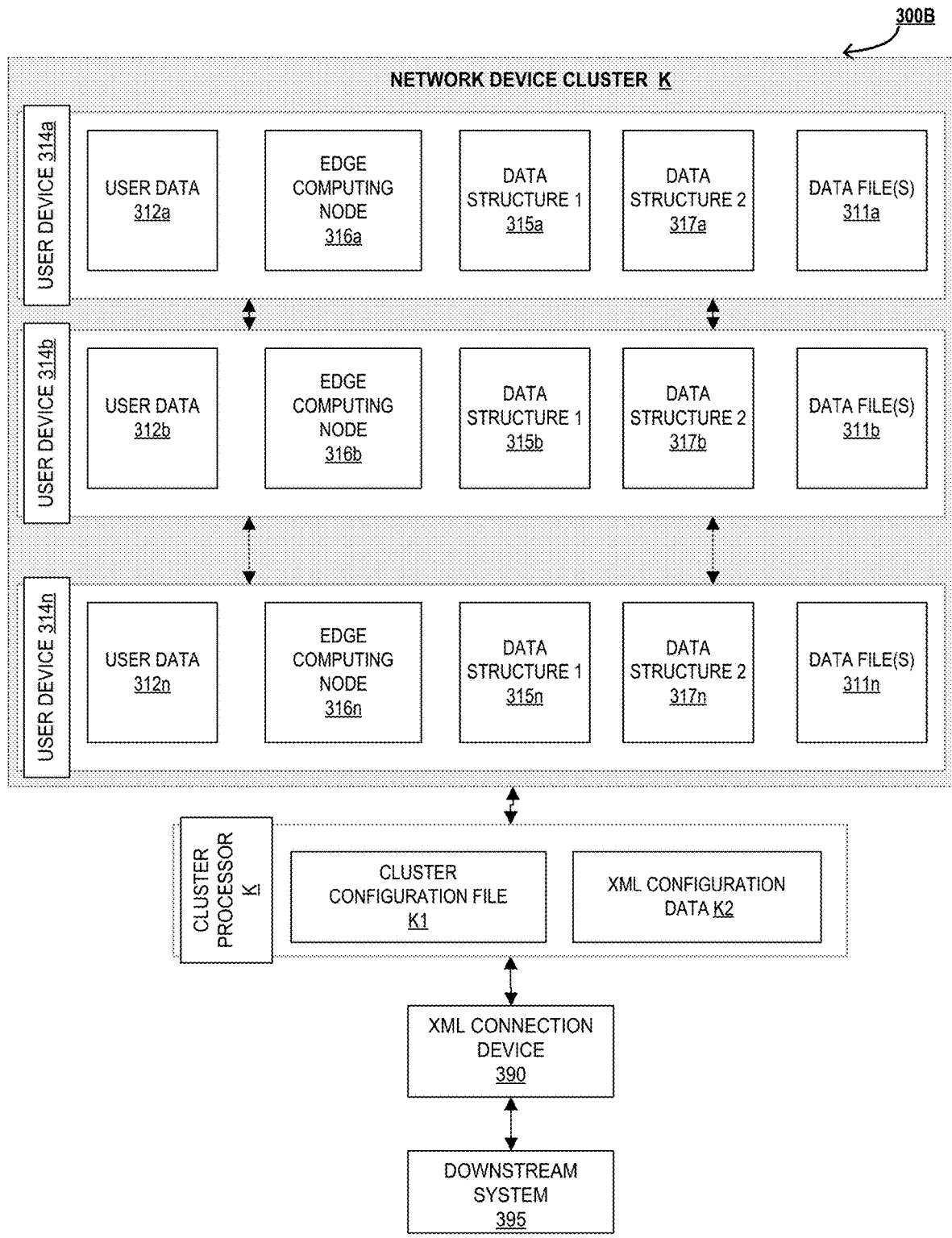
Figure 4:
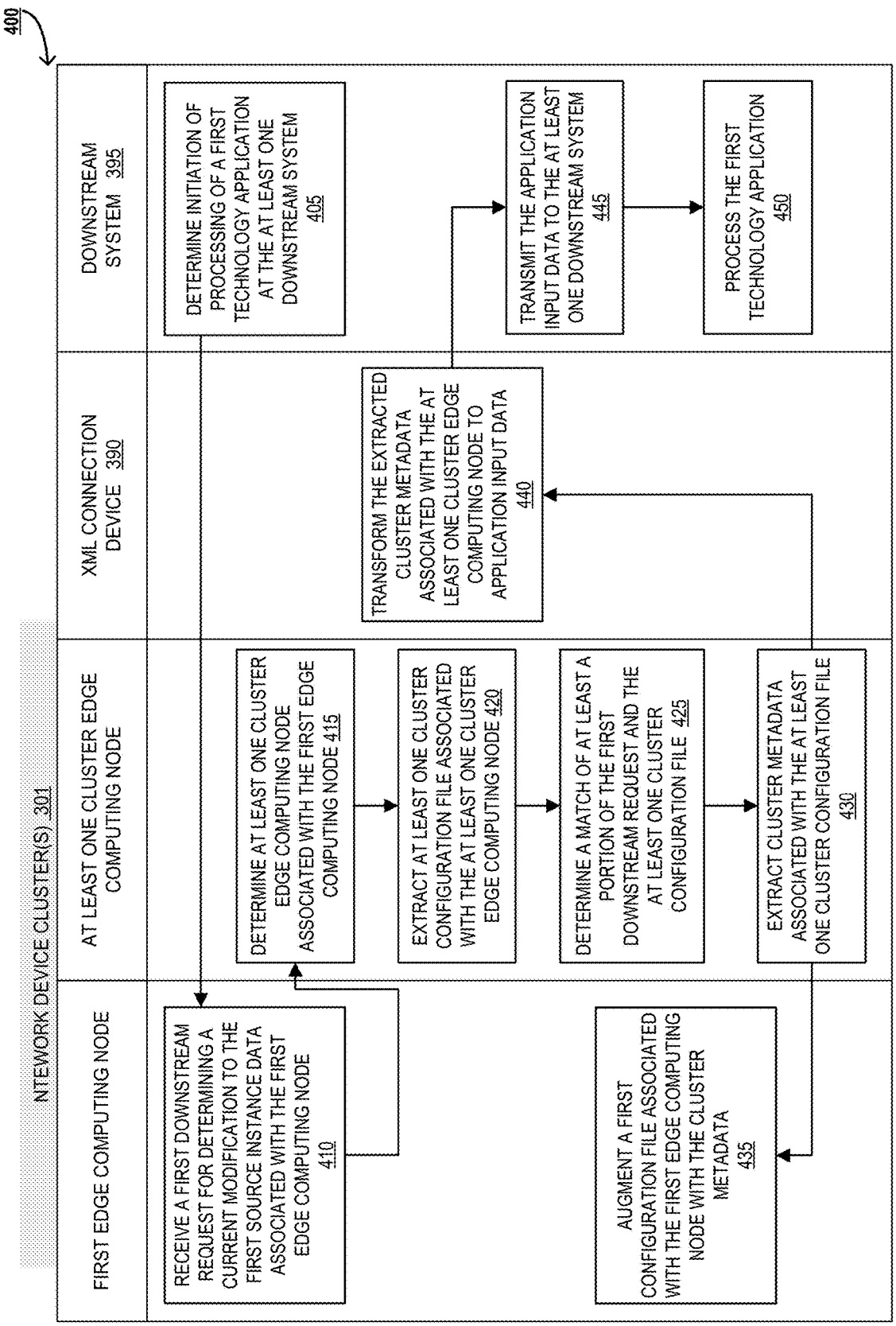
Figure 5:
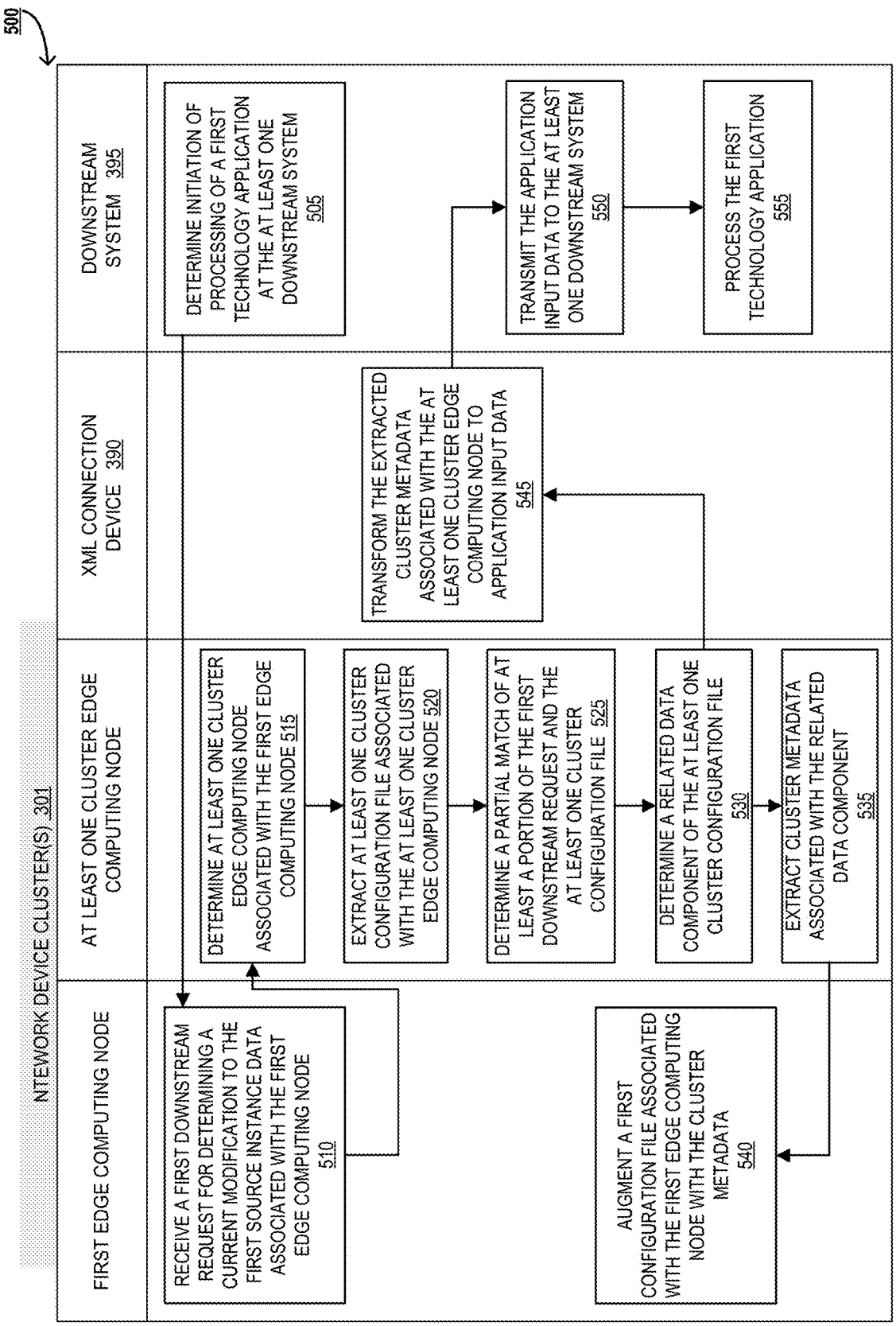

Having thus described embodiments of the invention in general terms, reference will now be made to the accompanying drawings, wherein:

FIG. 1 depicts a technology event processing system environment 100, in accordance with one embodiment of the present invention;

FIG. 2 depicts a schematic representation of a communication network environment 200, in accordance with one embodiment of the present invention;

FIG. 3A depicts a schematic representation of a communication network environment 300A, in accordance with one embodiment of the present invention;

FIG. 3B depicts a schematic representation of a communication network environment 300B, in accordance with one embodiment of the present invention;

FIG. 4 depicts a high level process flow 400 for dynamic processing of temporal upstream data and downstream data in communication networks; and FIG. 5 depicts a high level process flow 500 for dynamic processing of temporal upstream data and downstream data in communication networks.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

In some embodiments, an "entity" or "enterprise" as used herein may be any institution employing information technology resources and particularly technology infrastructure configured for large scale processing of electronic files, electronic technology event data and records, and performing/processing associated technology activities. In some instances, the entity's technology systems comprise multiple technology applications across multiple distributed technology platforms for large scale processing of technology activity files and electronic records. As such, the entity may be any institution, group, association, financial institution, establishment, company, union, authority or the like, employing information technology resources.

As described herein, a "user" is an individual associated with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer. In other embodiments, a user may be a system performing one or more tasks described herein.

In the instances where the entity is a financial institution, a user may be an individual or entity with one or more relationships affiliations or accounts with the entity (for example, a financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, user information provided by the user, or the like. The technology resource is typically associated with and/or maintained by an entity.

As used herein, a "user interface" may be a graphical user interface. Typically, a graphical user interface (GUI) is a type of interface that allows users to interact with electronic devices such as graphical icons and visual indicators such as secondary notation, as opposed to using only text via the command line. That said, the graphical user interfaces are typically configured for audio, visual and/or textual communication. In some embodiments, the graphical user interface may include both graphical elements and text elements. The graphical user interface is configured to be presented on one or more display devices associated with user devices, entity systems, processing systems and the like.

As discussed previously, each "electronic data file" or "technology event data file" or a "data file" often comprises multiple technology event records (for example, hundreds, thousands or tens of thousands of technology event records). Each technology event record may comprise multiple data elements or attributes containing electronic data regarding one or more aspects of an electronic/technology activity. In some instances, each technology event record may comprise technology elements associated with type of activity, instructions for processing the event record, technology resources involved, information associated with the users/ entities/systems involved, technology platform applications involved, processing events associated with each technology application, activity attributes, time, location, person/system that initiated/performed the activity, and/or other aspects. Furthermore, the technology elements may by discrete components of the record, or the technology elements may merely refer to one or more portions of a single data component in a record. Although referred to as "a technology event record", it is understood that, in some embodiments each activity may be associated with multiple technology event records.

For example, in the instances where the electronic data files comprise financial information, each electronic data file may comprise multiple technology event records, with each technology event record being associated with an electronic activity comprising a financial activity/transaction. Furthermore, each record may comprise one or more technology elements associated with type of activity (for example, debit, credit, resource transfer), instructions for processing the record (for example, type of processing), technology resources involved (for example, initiating resource/financial institution, receiving resource or financial institution, intermediate resource systems, domestic systems, international systems), technology platforms applications involved (for example, technology data processing applications, regulatory applications, internal applications), information associated with the users/entities/systems involved (for example, initiating or first user name, first user account identifiers, receiving or second user name, second user account identifiers), activity attributes (for example, resource quantity/amount, inbound and outbound currency), timestamp, and/or other aspects.

An electronic activity, also referred to as a technology activity, such as a "resource transfer" or "transaction," may refer to any activities or communication between a user or entity and the financial institution, activities or communication between multiple entities, communication between technology applications and the like. A resource transfer may refer to a payment, processing of funds, purchase of goods or services, a return of goods or services, a payment transaction, a credit transaction, or other interactions involving a user's account.

Typically, a network for an entity comprises a myriad systems, devices and nodes, with technology applications running thereon for performing numerous actions and activities associated with the network. Systems for high volume data processing require multiple edge nodes and technology applications across various platforms running in order to implement the multiple processing stages of electronic data. Each of the technology applications is associated with source system(s), such that data from the source system(s) is transmitted to the application and/or the data from the source system(s) is required as an input for processing the respective technology application. Similarly, each of the technology applications is associated with downstream system(s), such that the output from processing of the technology application is required by, utilized by, and/or transmitted to the downstream system(s). According, the entity network is a complex web of interconnected and interdependent systems, devices, nodes, technology applications, and the like.

Typically, processing of technology applications at downstream systems requires source data from upstream systems. However, downstream systems typically need to wait for upstream systems to provide current data and changes to the data (e.g., via scheduled batch processes), such as the details on the changes like column name, data type and dropped columns or new columns of an object to the downstream systems through some mapping documents, and/or the like. Due to inherent delays in data transmissions and utilizations of prior source data that is not current and incompatible with the application in real time, downstream systems may have undesirable failed processes and delayed processing. Moreover, conventional systems are not capable of dynamic data processing based on dynamic features like network and CPU utilization while identifying the real time object changes, file changes and reports mechanism on various source systems for cascading the changes to downstream systems. Therefore, a need exists for novel network architectures that provide dynamic processing of temporal upstream data and downstream data in communication networks.

The present invention provides solutions to the foregoing problems in conventional systems, and also provides additional improvements to network communication technology by providing novel dynamic processing of temporal upstream data and downstream data in communication networks. The present invention is configured for novel dynamic processing and cascading of instance data and configuration files from edge node devices of a distributed network for reduction of latency in data transmissions. In this manner, the present invention is structured to improve network performance by combatting latency. Moreover, conventional systems inherently utilize static upstream and downstream data transmission strategies which cannot adapt to current statuses of the network and its components. To alleviate this deficiency, the novel dynamic processing and cascading of instance data and configuration files of the present invention is structured to be dynamically adapted based on dynamic network features such as network utilization, processing power utilization (e.g., CPU utilization), memory utilization, and/or the like, for constructing device clusters and indexing source data from cluster nodes. Typically, the present invention structures each configuration files of edge nodes are dynamically updated based on static features such as context, data columns and data calculations, (e.g., last updated on and modified date etc.), and based on dynamic network features as well. Typically, the present invention structures each edge node such that the edge node verifies its own configuration file and updates dynamically to accommodate the dynamic network features such as network utilization, processing power utilization (e.g., CPU utilization), memory utilization, and/or the like, as well as static features like updated date, context, domain, and/or the like.

FIG. 1 illustrates a technology event processing system environment 100, in accordance with one embodiment of the present invention, which is structured for the novel dynamic processing of temporal upstream data and downstream data in communication networks. As illustrated in FIG. 1, a technology event processing system 108 is operatively coupled, via a network 101 to user device(s) 104, to an entity server 106, to a plurality of network nodes 180 (e.g., comprising a plurality of edge computing nodes), and to a technology server 105. In this way, the technology event processing system 108 can send information to and receive information from the user device(s) 104, the entity server 106, the plurality of network nodes 180, and the technology server 105. FIG. 1 illustrates only one example of an embodiment of the system environment 100, and it will be appreciated that in other embodiments one or more of the systems, devices, or servers may be combined into a single system, device, or server, or be made up of multiple systems, devices, or servers. In this way, the technology platform application 156 of the technology event processing system 108 is configured to process, index, chart and evaluate edge data and one or more configuration files and the associated metadata of the edge computing nodes, and perform the associated technology activities.

The network 101 may be a system specific distributive network receiving and distributing specific network feeds. The network 101 may also be a global area network (GAN), such as the Internet (201, illustrated in FIG. 2), a wide area network (WAN), a local area network (LAN), or any other type of network or combination of networks. The network 101 may provide for wireline, wireless, or a combination wireline and wireless communication between devices on the network 101. In some embodiments, at least a portion of the network 101 is an entity communication network 200 associated with the entity, illustrated in FIG. 2.

In some embodiments, the technology event processing system 108 and the plurality of network nodes 180, together with the entity server 106 and/or one or more of the user devices 104, constitute the entity communication network 200, each forming a network node of the entity communication network 200. That said, in other embodiments, it is envisaged that the entity communication network 200 comprises the plurality of network nodes 180 which interact with the technology event processing system 108, the entity server 106 and/or one or more of the user devices 104 that are external to the entity communication network 200. Typically, the network nodes (e.g., the network nodes 180, the technology event processing system 108, the entity server 106, and/or the user device(s) 104) of the entity communication network 200 comprise operative communication channels for communicating with each other, in accordance with the network architecture of the entity communication network, as will be described with respect to FIG. 2. The operative transformation for clustering the network nodes (e.g., technology event processing system 108, user device 104 etc.) is described with respect to FIGS. 3A-3B, later on.

In some embodiments, the user 102 may be one or more individuals or entities that may either initiate processing/execution of a technology application, require outputs downstream from technology applications, provide the electronic files for processing, desire access to at least a portion of the technology event data associated with the electronic files or records that have either been processed or are being processed, and/or the request access to data associated with the technology activities associated with the event records. As such, in some embodiments, the user 102 may be associated with the entity and/or a financial institution that may desire one or more data points associated with the processing of entity technology applications, electronic files associated with the technology event processing system.

FIG. 1 also illustrates a representative user system/device 104. As discussed, the user device(s) 104 may be, for example, a desktop personal computer, a mobile system, such as a cellular phone, smart phone, personal digital assistant (PDA), laptop, or the like, and each of the user devices (e.g., devices 104a-104d) may comprise the technical/electronic components described herein. The user device(s) 104 generally comprises a communication device 112, a processing device 114, and a memory device 116. The user device 104 is typically a computing system that is configured to enable user and device authentication for access to technology event data. The processing device 114 is operatively coupled to the communication device 112 and the memory device 116. The processing device 114 uses the communication device 112 to communicate with the network 101 and other devices on the network 101, such as, but not limited to, the entity server 106, the technology event processing system 108 and the technology server 105. As such, the communication device 112 generally comprises a modem, server, or other device for communicating with other devices on the network 101.

The user device 104 comprises computer-readable instructions 110 and data storage 118 stored in the memory device 116, which in one embodiment includes the computer-readable instructions 110 of a user application 122. In some embodiments, the technology event processing system 108 and/or the entity system 106 are configured to cause the processing device 114 to execute the computer readable instructions 110, thereby causing the user device 104 to perform one or more functions described herein, for example, via the user application 122 and the associated user interface. In some embodiments, the first device application of the one or more user applications 122 refers to an application stored on the user device that is configured to receive user instructions/input via an associated first user interface, and in accordance with the user input perform one or more tasks or activities and associated steps (e.g., requesting information, retrieving/receiving information, perform searches, query other applications/servers, and/or the like) whose data flow through the network is desired to be evaluated in real-time or near real-time. For example, the first technology application may be structured to perform a first type of network activity (e.g., Website front end activities, entity logic middleware activities, server-less activities, Queueing activities, Caching activities, Database activities, DNS, Proxy, Firewall and other activities) associated with the entity.

As further illustrated in FIG. 1, the technology event processing system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device, such as the processing device 148, typically includes functionality to operate one or more software programs and technology platform applications based on computer-readable instructions thereof, which may be stored in a memory device, for example, executing computer readable instructions 154 or computer-readable program code 154 stored in memory device 150 to perform one or more functions associated with a technology platform application 156

The processing device 148 is operatively coupled to the communication device 146 and the memory device 150. The processing device 148 uses the communication device 146 to communicate with the network 101 and other devices on the network 101, such as, but not limited to the entity server 106, the technology server 105 and the user system 104. As such, the communication device 146 generally comprises a modem, server, or other device for communicating with other devices on the network 101.

As further illustrated in FIG. 1, the technology event processing system 108 comprises the computer-readable instructions 154 stored in the memory device 150, which in one embodiment includes the computer-readable instructions 154 of the technology platform application 156. In some embodiments, the computer readable instructions 154 comprise executable instructions associated with network nodes 180, technology platform applications, proctor modules, memory locations, technology event processing module and/or its components, associated with the technology platform application 156, wherein these instructions, when executed, are typically configured to cause the applications or modules to perform/execute one or more steps described herein. In some embodiments, the memory device 150 includes data storage 152 for storing data related to the system environment, but not limited to data created and/or used by the technology platform application 156. The technology platform application 156 is further configured to perform or cause other systems and devices to perform the various steps in processing electronic records, as will be described in detail later on.

As such, the processing device 148 is configured to perform some or all of the dynamic processing of temporal upstream data and downstream data in communication networks steps described throughout this disclosure, for example, by executing the computer readable instructions 154. In this regard, the processing device 148 may perform one or more steps singularly and/or transmit control instructions that are configured to cause technology platform applications, proctor modules, event processing modules, entity server 106, user device 104, and technology server 105 and/or other systems and applications, to perform one or more steps described throughout this disclosure. Although various data processing steps may be described as being performed by technology platform applications, proctor modules, memory locations, technology event processing module and/or its components and the like in some instances herein, it is understood that the processing device 148 is configured to establish operative communication channels with and/or between these modules and applications, and transmit control instructions to them, via the established channels, to cause these module and applications to perform these steps.

Embodiments of the technology event processing system 108 may include multiple systems, servers, computers or the like maintained by one or many entities. FIG. 1 merely illustrates one of those systems 108 that, typically, interacts with many other similar systems to form the information network. In one embodiment of the invention, the technology event processing system 108 is operated by the entity associated with the entity server 106, while in another embodiment it is operated by a second entity that is a different or separate entity from the entity server 106. In some embodiments, the entity server 106 may be part of the technology event processing system 108. Similarly, in some embodiments, the technology event processing system 108 is part of the entity server 106. In other embodiments, the entity server 106 is distinct from the technology event processing system 108.

In one embodiment of the invention, the technology platform application 156 may be associated with technology platform applications having computer-executable program code that instructs the processing device 148 to operate the network communication device 146 to perform certain communication functions involving the technology server 105, the user device 104 and/or the entity server 106, as described herein. In one embodiment, the computer-executable program code of an application associated with the technology platform application 156 may also instruct the processing device 148 to perform certain logic, data processing, and data storing functions of the application.

The processing device 148 is configured to use the communication device 146 to receive data, such as electronic data files comprising technology event records, receive requests for processing status and processed event data, transmit processed event data and the like. In some instances, the processing device 148 stores the data that it receives in its native format in the memory device 150, for example, in an off-disk database associated with the data storage 152, described in detail with respect to FIG. 2.

In the embodiment illustrated in FIG. 1 and described throughout much of this specification, the technology platform application 156 may perform one or more of the functions described herein (e.g., steps described with respect to FIGS. 4 and 5), by the processing device 148 executing computer readable instructions 154 and/or executing computer readable instructions associated with one or more technology platform applications.

As illustrated in FIG. 1, the entity server 106 is connected to the technology event processing system 108 and may be associated with a financial institution network. In this way, while only one entity server 106 is illustrated in FIG. 1, it is understood that multiple network systems may make up the system environment 100 and be connected to the network 101. The entity server 106 generally comprises a communication device 136, a processing device 138, and a memory device 140. The entity server 106 comprises computer-readable instructions 142 stored in the memory device 140, which in one embodiment includes the computer-readable instructions 142 of an institution application 144. The entity server 106 may communicate with the technology event processing system 108. The technology event processing system 108 may communicate with the entity server 106 via a secure connection generated for secure encrypted communications between the two systems for communicating data for processing across various applications.

As further illustrated in FIG. 1, in some embodiments, the technology event processing system environment 100 further comprises a technology server 105, in operative communication with the technology event processing system 108, the entity server 106, and/or the user device 104. Typically, the technology server 105 comprises a communication device, a processing device and memory device with computer readable instructions. In some instances, the technology server 105 comprises one or more data processing applications configured for downstream processing event records associated with the electronic files received from the technology event processing system. These applications may be operated by the processor executing the computer readable instructions associated with the technology server 105, as described previously. In some instances, the technology server 105 is owned, operated or otherwise associated with third party entities, while in other instances, the technology server 105 is operated by the entity associated with the systems 108 and/or 106. Although a single external technology server 105 is illustrated, it should be understood that, the technology server 105 may represent multiple technology servers operating in sequentially or in tandem to perform one or more data processing operations.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 depicts a schematic representation of a communication network environment 200, in accordance with one embodiment of the present invention. As discussed, in some embodiments, the technology event processing system 108 and the plurality of network nodes 180, together with the entity server 106 and/or one or more of the user devices 104, constitute the entity communication network 200, each forming a network node of the entity communication network 200. That said, in other embodiments, it is envisaged that the entity communication network 200 comprises the plurality of network nodes 180 which interact with the technology event processing system 108, the entity server 106 and/or one or more of the user devices 104 that are external to the entity communication network 200. Typically, the network nodes (e.g., the network nodes 180, the technology event processing system 108, the entity server 106, and/or the user device(s) 104) of the entity communication network 200 comprise operative communication channels for communicating with each other, in accordance with the network architecture of the entity communication network. In some embodiments, the entity communication network 200 has network nodes comprising physical nodes/devices and/or virtual nodes such as software (e.g., for routing, switching and other data flow operations), such that at least a portion of the network 200 is virtualized with software. In some embodiments, the entity communication network 200 comprises a cloud computing network. In some embodiments, some or all of the network nodes are associated with technology applications.

As illustrated by FIG. 2, the entity communication network 200 comprises a plurality of nodes (e.g., 205 to 266). Some or all of the nodes 205-266 described herein may refer to the plurality of nodes 180. Moreover, the entity communication network 200 is typically in communication with an external communication network, such as the internet 310 or another network 310 (e.g., an ISP network). The entity communication network 200 comprises a network security node 205, such as a firewall 205, that monitors and controls incoming and outgoing network traffic based on predetermined security rules. The network security node may be in operative communication with one or more network nodes 210 structured for modulating one or more carrier wave signals to encode digital information for transmission and demodulating signals to decode the transmitted information, such as modem(s) 210. The entity communication network 200 further comprises one or more network nodes 215 that are configured for traffic routing and data packet forwarding, such as router(s) 215. The router node 215 may be in operative communication with other network nodes such as, access point node(s) 230 (e.g., wireless access point 230), proxy servers, switches (240, 250), server systems 220 (e.g., entity server 106, technology event processing system 108, etc.), and the like. The wireless access point 230, typically is a networking hardware device that allows Wi-Fi or NFC compatible data terminal equipment devices (DTEs) or computing devices 236a-236c (e.g., user devices 104 such as computers, smartphones, PDAs, smart devices, etc.) to connect to a wired network. The server systems 220 (e.g., entity server 106, technology event processing system 108, etc.) may be in operative communication with database systems or database server nodes 222.

The network switch nodes (240, 250) (also called switching hubs, bridging hubs, or MAC bridges) are computer network devices/nodes that connect other devices/nodes of the network together, by using packet switching to receive, process and forward data to a destination device/node. In some embodiments, the network switch nodes (240, 250) are multi-port network bridges that use unique network hardware addresses (e.g., MAC addresses of the devices/nodes such as the data terminal equipment devices) to process and forward data at a data link layer (described later on) of the entity communication network 200. In some embodiments, the network switch nodes (240, 250) are multilayer switches that also process data at a network layer by additionally incorporating routing functionality. As illustrated by FIG. 2, the network switch 240 may connect other data terminal equipment (DTEs) devices/nodes such as server devices 242 (e.g., entity server 106, Technology event processing system 108 etc.) and a hub 244 which in turn connects nodes such as 246a-246d (e.g., entity server 106, Technology event processing system 108, user devices 104, other DTEs etc.). The hub 244 may be an Ethernet hub, active hub, network hub, repeater hub, multiport repeater or another network switch. The network switch 250 may connect network nodes such as a server 256a, a proxy server 256b, a computing device 256c, etc. The computing device 256c may in turn be operatively connected to other nodes such as a printer terminal 258 and a network bridge 260. The network bridge 260 is a computer networking device that creates a single aggregate network from multiple communication networks or network segments, such as the nodes 266a-b (e.g., computing devices or other DTEs) and the node 266c (e.g., a server or other DTEs), as illustrated. The entity communication network 200 may further comprise one or more load balancers (not illustrated).

As such, the entity communication network 200 comprises a plurality of nodes 180 such as one or more of: one or more modems, one or more hubs, one or more switches, one or more routers, one or more load balancers, and one or more data terminal equipment devices, cloud service virtual machines, VPN Gateways, traffic manager nodes, SQL servers, etc., as desired, in any suitable configuration and arrangement. The DTEs typically comprise unique network addresses (e.g., hardware addresses such as media access control (MAC) addresses, network addresses such as internet protocol (IP) addresses), such as server devices, proxy servers, one or more computing devices, one or more data output devices, and/or one or more network hosts. Moreover, in some embodiments, the network nodes 180 and connections/communication channels between the nodes may change, due to expansion, modification or maintenance of the networks. The system (e.g., the processing/control system 106) is configured to identify the current configuration of the entity communication network 200's network architecture, i.e., the plurality of network nodes of the entity communication network and their communication channels and protocols.

In some embodiments, determining the network architecture of the entity communication network by the technology platform application by the processing/control system 106 further comprises identifying data communication links between the plurality of nodes and unique network addresses (e.g., hardware addresses such as media access control (MAC) addresses, network addresses such as internet protocol (IP) addresses) of the plurality of network nodes required/utilized for operative communication using the data communication links. Here, in some embodiments, the processing/control system 106 is structured to identify a physical layer, a data link layer, a network layer, a transport layer, a session layer, a presentation layer and/or an application layer of the network architecture.

The physical layer is typically associated with transfer of bits between two network nodes involving nodes such as repeaters, hubs, modems, fiber media converters and the like. The physical layer defines the electrical and physical specifications of the data connection and defines the relationship between a device and a physical transmission medium (for example, an electrical cable, an optical fiber cable, or a radio frequency link). This includes the layout of pins, voltages, line impedance, cable specifications, signal timing and similar characteristics for connected devices and frequency (5 GHz or 2.4 GHz etc.) for wireless devices. It is responsible for transmission and reception of unstructured raw data in a physical medium. As such, identifying the physical layer of the network architecture by the control system 106 typically involves determining the above listed components of the physical layer along with networking hardware transmission protocols for transmission of bit streams physical links of the data communication links between the plurality of nodes.

The data link layer typically involves interfacing with the physical layer by providing node-to-node transfer (e.g., a link between two directly connected nodes) and involves network nodes such as network switches, network interface cards (NICs), etc., based on physical addressing schemes (e.g., MAC addresses). The data link layer is also configured for detection and correction of errors in the physical layer and defines protocols for establishing and terminating a connection between two physically connected nodes/devices and protocols governing data flow control between them, such as Point-to-Point Protocol (PPP), Media access control (MAC) layer protocols for data transmission permissions/access and flow control and Logical link control (LLC) layer protocols for encapsulating network layer protocols and frame synchronization. Identifying the data link layer of the network architecture by the control system 106, typically involves determining the foregoing and the networking transmission protocols for frame synchronization, logical link control and media access control associated with the data communication links between the plurality of nodes. In this regard, the control system 106 typically identifies media access control (MAC) addresses of at least a portion of the plurality of nodes (e.g., for some or all of the network nodes that contain MAC addresses).

The network layer typically is associated with data packet delivery from end (e.g., source node) to end (intermediate or destination node) by utilizing a logical network addressing scheme such as Internet Protocol (IP) addresses, involving nodes such as routers. As such, the network layer provides the functional and procedural means of transferring variable length data sequences (called datagrams) from one node to another. The network layer is structured to deliver the message to the destination node, possibly routing it through intermediate nodes. If the message is too large to be transmitted from one node to another on the data link layer between those nodes, the network layer may implement message delivery by splitting the message into several fragments (multiple data packets) at one node, sending the fragments independently, and reassembling the fragments at another node. Identifying the network layer of the network architecture by the control system 106 typically involves identifying data packet forwarding and routing protocols associated with the data communication links between the plurality of nodes and identifying internet protocol (IP) addresses of at least a portion of the plurality of nodes.

Moreover, the transport layer provides the functional and procedural means of transferring variable-length data sequences from a source to a destination host via one or more networks, while maintaining the quality of service functions, using a transport-layer protocol such as a Transmission Control Protocol (TCP) or a User Datagram Protocol (UDP). Identifying the transport layer of the network architecture typically involves determining host-to-host communication protocols for technology applications associated with at least a portion of the plurality of nodes. The session layer is associated with establishing, managing and terminating the connections between the local and remote applications. The presentation layer establishes context between application-layer entities, in which the application-layer entities may use different syntax and semantics if the presentation service provides a mapping between them. The application layer interacts with the technology applications (software) that implement a communicating component, including identifying communication partners, determining resource availability, and synchronizing communication.

FIG. 3A depicts a schematic representation of a communication network environment 300A, in accordance with one embodiment of the present invention. Typically, the network environment comprises a plurality of network nodes 180, as described previously. Typically, the plurality of network nodes 180 comprise a plurality of edge computing nodes (314a, 314b, 314c, 314d, 324a, 326a, 324b, 326b, and/or the like). As illustrated, as a non-limiting example, some or all of the edge computing nodes are of the user device type (314a, 314b, 314c, 314d, 324a, 324b, and/or the like). Typically, each of the plurality of edge computing nodes are associated with, and operate upon, dynamic instance data generated by an associated user. In accordance with embodiments of the inventions, each edge computing node is structured to maintain source changes at object level, files and reports information, user activity and information data, and/or the like. Moreover, in accordance with embodiments of the inventions, each edge computing node is structured to verify its own configuration file. In accordance with embodiments of the inventions, each edge computing node is structured to send and receive updates from other edge computing nodes in its network device cluster, for instances, for recommendation of the columns, tables, views, reports or files. In response to determining changes to instance data, the edge computing node is structured to update its own configuration file. Moreover, each edge computing node is structured for operative communication with its associated cluster processor (also referred to as a cluster server). In accordance with embodiments of the inventions, each edge computing node is structured to send and receive updates of metadata.

The network environment further comprises one or more cluster processor devices (318, 328) (also referred to as a cluster servers), an XML connection device 390 (also referred to as an XML engine) and at least one downstream system 395, as illustrated. Each of the cluster processor devices (318, 328) are network nodes that are structured for operative communication with the edge computing nodes in its associated network device cluster, as well as the XML connection device 390. Moreover, typically, edge computing nodes, associated network device clusters, and/or cluster processor devices (318, 328) may contain source changes like object or columns level changes, reports and files in various technologies and associated metadata, which are incompatible for user processing of technology applications at downstream system(s) 395. To address this problem, the XML connection device 390 is structured to convert these object changes into an XML format (or another suitable format) to read/process the metadata information and provide recommendations for upstream data retrieval and changes.

In some embodiments, the system 108 (referred to as "the system"), may itself read or cause the associated edge computing node and/or cluster processor device to read all the source changes like objects, files, column updates and reports and/or the like at each edge node and cluster node. Subsequently, the system 108, may itself notify or cause the associated edge computing node and/or cluster processor device to notify availability of source updates on one or more edge computing nodes and/or cluster processor devices. Moreover, the system 108, may itself create/populate or cause the associated edge computing node and/or cluster processor device to create/populate the associated configuration file for each edge computing node and/or cluster processor. Moreover, the system 108, may itself create/populate or cause the XML connection device 390 to create/populate the XML configuration data at cluster level (e.g., at cluster processor(s)) in order to obtain/provide the latest metadata changes at real-time or near real-time.

In accordance with embodiments of the invention, the system 108 is configured to construct a first device cluster 301 (network device cluster 301) comprising one or more first cluster edge computing nodes (314a, 314b, 314c, 314d, and/or the like) of the plurality of edge computing nodes 180. FIG. 3A illustrates a non-limiting example of arrangement of the one or more first cluster edge computing nodes (314a, 314b, 314c, 314d, and/or the like). It is noted that the first device cluster 301 may comprise several more nodes or fewer nodes and may comprise various arrangements and combinations. Typically, each of the one or more first cluster edge computing nodes (314a, 314b, 314c, 314d, and/or the like) are associated with first source instance data.

In some embodiments, in order to construct the first device cluster 301, the system (e.g., system 108) may analyze the source instance data associated with each of the plurality of edge computing nodes (e.g., the nodes 180) to determine a match associated with at least a portion of source instance data associated with each of the plurality of edge computing nodes. For instance, in an entity network, network nodes associated with the same function, same geography, same network tier, same or similar associated technology applications or processes may be associated with common or overlapping data indicating the same. The system may determine the one or more first cluster edge computing nodes (314a, 314b, 314c, 314d, and/or the like) of the plurality of edge computing nodes as the first device cluster 301, in response to determining that a match associated with at least a portion of source instance data associated with each of the plurality of edge computing nodes. In some embodiments, the system may further construct the clusters based on dynamic network requirements, such that dynamic network parameters such as network utilization, processing power utilization (e.g., CPU utilization), memory utilization, and/or the like, are within predetermined threshold ranges for each cluster, either singularly for each node and/or cumulatively for the cluster. The system may then assign a first cluster processor device 318 of the one or more cluster processor devices to the first device cluster 301 such that the first cluster processor device is operatively coupled to each of the one or more first cluster edge computing nodes (314a, 314b, 314c, 314d, and/or the like) of the first device cluster 301.

In this manner, the system may construct any suitable number of clusters, such as "n" number of clusters, e.g., with a first cluster having "k" number of edge computing nodes, . . . , with an $(n-1)^{th}$ cluster having "l" number of edge computing nodes, and the $n^{th}$ cluster having "m" number of edge computing nodes. Here, the foregoing elements n, m, k, l, etc., may represent any suitable whole number. For example, as illustrated by FIG. 3A, the system is further configured to construct a second device cluster 302 (network device cluster 302) comprising one or more second cluster edge computing nodes (326a, 324b, 326b, and/or the like) of the plurality of edge computing nodes 180. Typically, each of the one or more second cluster edge computing nodes (326a, 324b, 326b, and/or the like) are associated with second source instance data.

In some embodiments, in order to construct the second device cluster 302, the system (e.g., system 108) may analyze the source instance data associated with each of the plurality of edge computing nodes (e.g., the nodes 180) to determine a match associated with at least a portion of source instance data associated with each of the plurality of edge computing nodes. The system may determine the one or more second cluster edge computing nodes (326a, 324b, 326b, and/or the like) of the plurality of edge computing nodes as the second device cluster 302, in response to determining that a match associated with at least a portion of source instance data associated with each of the plurality of edge computing nodes. The system may then assign the second cluster processor device 328 of the one or more cluster processor devices to second device cluster 302 such that the second cluster processor device is operatively coupled to each of the one or more second cluster edge computing nodes (326a, 324b, 326b, and/or the like) of the second device cluster 302.

FIG. 3B depicts a schematic representation of a communication network environment 300B with a non-limiting example of a $K^{th}$ network device cluster, in accordance with one embodiment of the present invention. Typically, the network environment comprises a plurality of network nodes 180, as described previously. Typically, the plurality of network nodes 180 comprise a plurality of edge computing nodes (314a, 314b, . . . 314n, and/or the like). Typically, each of the plurality of edge computing nodes are associated with dynamic instance data generated by an associated user. The system may construct the $K^{th}$ network device cluster with the edge computing nodes (314a, 314b, . . . 314n, and/or the like) such as the ones of user device types, as discussed previously, The system may further assign a $K^{th}$ network cluster processor device to the $K^{th}$ network device cluster with the edge computing nodes (314a, 314b, . . . 314n, and/or the like). As discussed previously, the network environment may further comprise an XML connection device 390 and at least one downstream system 395.

The system is configured to construct a Kth device cluster (network device cluster K) comprising one or more cluster edge computing nodes (314a, 314b, . . . 314n, and/or the like) of the plurality of edge computing nodes 180. Typically, each of the one or more cluster edge computing nodes (314a, 314b, . . . 314n, and/or the like) are associated with first source instance data comprising user data (312a, 312b, . . . 312n) associated with the respective user and the user's applications, edge computing node data (316a, 316b, . . . 316n), data structure 1 such as table data (315a, 315b, . . . 315n), data structure 2 such as column data (317a, 317b, . . . 317n), data file(s) (311a, 311b, . . . 311n), and/or the like, respectively. Moreover, the $K^{th}$ network cluster processor device may be associated with a cluster configuration file K1 and an XML configuration data K2.

Typically, each the one or more cluster edge computing nodes (314a, 314b, 314n, and/or the like) contains a configuration file (e.g., data file(s) (311a, 311b, . . . 311n), and/or a combination of data structures 1 and 2 and the data files(s)), which is dynamically updated (either by the system 108, the respective node, and/or the cluster processor K) based on static features such as context, data columns and data calculations, (e.g., last updated on and modified date etc.), and based on dynamic network features as well. Moreover, each the one or more cluster edge computing nodes (314a, 314b, . . . 314n, and/or the like) is structured to verify its own config file and updates the same in response to dynamic network features such as network utilization, processing power utilization (e.g., CPU utilization), memory utilization, and/or the like, and static features like object changes, context, and/or the like. In some embodiments, the configuration files are updated at a frequency that matches modifications/changes to instance data at associated edge nodes and clusters. Moreover, the XML configuration data K2 and the cluster configuration file K1 may also to be updated based on the changes in the edge node and cluster level, and recommendations for data changes and updated data are provided to respective nodes, users, and downstream systems.

FIG. 4 depicts a high level process flow 400 for dynamic processing of temporal upstream data and downstream data in communication networks, in accordance with some embodiments of the invention. Specifically, the high level process flow 400 illustrates an embodiment where a match is identified with an associated cluster node, as will be described in detail below. In some embodiments, some or all of the steps herein are performed by the system 108 (referred to as "the system") either by itself, and/or by the system causing other nodes, devices, components of the network to perform the step(s). In some embodiments, the technology platform application 156 may perform one or more of the steps described herein, by the processing device 148 executing computer readable instructions 154 and/or executing computer readable instructions associated with one or more technology platform applications.

As illustrated by block 405 the system may determine initiation of processing of a first technology application at the at least one downstream system. Here, the processing of the first technology application is associated with, or requires, an input of first source instance data (e.g., in the form of tables, columns, files, etc.) associated with a first edge computing node (e.g., similar to node 314a of FIG. 3A) of the plurality of edge computing nodes.

Next, at block 410, the system may receive a first downstream request for determining a current modification to the first source instance data associated with the first edge computing node. In some embodiments, the system may extract, via the first edge computing node, a first configuration file associated with the first edge computing node. In response to determining a match of at least a portion of the first downstream request and the first configuration file associated with the first edge computing node, the system may extract first metadata associated with the first configuration file. Here, in some embodiments, the system may determine the downstream request based on determining an error in the available first source instance data associated with the first edge computing node at the downstream system. Here, the system may extract and analyze first metadata associated with the first configuration file of the first edge computing node to determine any errors, such as a mismatch between the extracted first metadata from the and the first technology application. The system may also determine whether the extracted first metadata is associated with modification to the first source instance data associated with the first edge computing node, or if the extracted metadata is not relevant to the modification to the first source instance data. Typically, in conventional systems, the process may fail at this step due to the incompatibility of the data from the first edge computing node with the technology application associated with the downstream request, due to the errors, and/or the data being out of date. However, the present invention solves this problem by the clustering described in FIGS. 3A-3B. The system invokes other cluster nodes for the requisite data such that the technology application can still be processes using relevant data from other cluster nodes, even though the downstream request was made for the first cluster node.

Next, at block 415, the system may determine at least one cluster edge computing node (e.g., similar to node 314c of FIG. 3A) associated with the first edge computing node (e.g., similar to node 314a of FIG. 3A), such that the first edge computing node and the at least one cluster edge computing node are associated with the same device cluster (e.g., similar to network device cluster 301 of FIG. 3A) of the of the plurality of edge computing nodes. In some embodiments, the system may determine the at least one cluster edge computing node associated with the first edge computing node in response to determining (i) the mismatch between the extracted first metadata and the first technology application, and/or determining that (ii) the extracted first metadata is not associated with modification to the first source instance data associated with the first edge computing node.

In some embodiments, to determine the at least one cluster edge computing node associated with the first edge computing node, the system may determine the device cluster (e.g., similar to network device cluster 301 of FIG. 3A) that the first edge computing node belongs to. Here, the first edge computing node (e.g., similar to node 314a of FIG. 3A) is one of the one or more first cluster edge computing nodes of that device cluster (e.g., similar to network device cluster 301 of FIG. 3A). In this regard, the system may identify other nodes of the cluster, i.e., one or more first cluster edge computing nodes of the plurality of edge computing nodes that are associated with the first device cluster. The system may then determine one or more of the one or more first cluster edge computing nodes (other than the first edge computing node or that are not the first edge computing) node as the at least one cluster edge computing node (e.g., similar to node 314c of FIG. 3A).

Next, at block 420, the system may extract at least one cluster configuration file associated with the at least one cluster edge computing node. The system may then analyze the at least one cluster configuration file associated with the at least one cluster edge computing node (e.g., similar to node 314c of FIG. 3A) to determine whether the configuration file associated with the at least one cluster edge computing node matches the downstream request and the associated input requirements to the technology application.

Next, block 425 illustrate the instance where the system determines a match of at least a portion of the first downstream request and the at least one cluster configuration file associated with the at least one cluster edge computing node (e.g., similar to node 314c of FIG. 3A). Here, the system may determine a match between at least one of a table, a view and/or a column associated with the first downstream request and the at least one cluster configuration file of the at least one cluster edge computing node (e.g., similar to node 314c of FIG. 3A).

Next, at block 430, the system may extract cluster metadata associated with the at least one cluster configuration file associated with the at least one cluster edge computing node. The system may configure the cluster metadata such that the cluster metadata indicates the current version of source/instance data associated with the at least one cluster edge computing node (e.g., similar to node 314c of FIG. 3A), and/or a version that is more recent that the one extracted from the first edge computing node. Next, at block 435, the system may update the configuration file of the first edge computing node (e.g., similar to node 314a of FIG. 3A) by augmenting the first configuration file associated with the first edge computing node with the cluster metadata. The system may also update the configuration files of the other nodes in the cluster. The system may transmit, from the at least one cluster edge computing node (e.g., similar to node 314c of FIG. 3A), the cluster metadata associated with the at least one cluster configuration file to a third edge computing node (e.g., similar to node 314d of FIG. 3A) (or any other nodes) of the one or more first cluster edge computing nodes of the first device cluster. The system may then augment a third configuration file (or other configuration files of the other nodes in the cluster) associated with the third edge computing node (or any other nodes) with the cluster metadata associated with the at least one cluster configuration file associated with the at least one cluster edge computing node (e.g., similar to node 314c of FIG. 3A).

The system may also update the cluster configuration file of the associated cluster processor (e.g., similar to cluster processor 318 of FIG. 3A) at the cluster level. Here, the system may augment a first cluster processor configuration file associated with a first cluster processor device (e.g., similar to cluster processor 318 of FIG. 3A) of the one or more cluster processor devices operatively coupled to each of the one or more first cluster edge computing nodes of the first device cluster (e.g., similar to network device cluster 301 of FIG. 3A). Moreover, any modifications, or changes to the cluster configuration file at the cluster level are automatically reflected in that of the respective nodes. For instance, the system may augment configuration files associated with the first edge computing node, second edge computing node, third edge computing node, and/or the like, with the cluster metadata associated with the at least one cluster configuration file associated with the at least one cluster edge computing node.

Next, at block 440, the system may transform, via an extensible markup language (XML) connection device, the extracted cluster metadata associated with the at least one cluster edge computing node to application input data, such that application input data is compatible with the at least one downstream system. As discussed previously, typically, edge computing nodes, associated network device clusters, and/or cluster processor devices (318, 328) may contain source changes like object or columns level changes, reports and files in various technologies and associated metadata, which are incompatible for user processing of technology applications at downstream system(s) 395. To address this problem, the XML connection device 390 is structured to convert these object changes into an XML format (or another suitable format) to read/process the metadata information and provide recommendations for upstream data retrieval and changes.

Next, at block 445, the system may transmit the application input data to the at least one downstream system. Here, the system may transform, via the extensible markup language connection device (e.g., similar to XML connection device 390 of FIG. 3A), the extracted first metadata associated with the first edge computing node to the application input data, such that application input data is compatible with the at least one downstream system.

Subsequently, at block 450, the system may process the first technology application at the at least one downstream system using the application input data. The system may then provide the output from processing the first technology application to a related user and/or to any other suitable systems.

FIG. 5 depicts a high level process flow 500 for dynamic processing of temporal upstream data and downstream data in communication networks. Specifically, the high level process flow 500 illustrates an embodiment where a partial match is identified with an associated cluster node, as will be described in detail below. In some embodiments, some or all of the steps herein are performed by the system 108 (referred to as "the system") either by itself, and/or by the system causing other nodes, devices, components of the network to perform the step(s). In some embodiments, the technology platform application 156 may perform one or more of the steps described herein, by the processing device 148 executing computer readable instructions 154 and/or executing computer readable instructions associated with one or more technology platform applications.

As illustrated by block 505 the system may determine initiation of processing of a first technology application at the at least one downstream system. Here, the processing of the first technology application is associated with, or requires, an input of first source instance data (e.g., in the form of tables, columns, files, etc.) associated with a first edge computing node (e.g., similar to node 314a of FIG. 3A) of the plurality of edge computing nodes.

Next, at block 510, the system may receive a first downstream request for determining a current modification to the first source instance data associated with the first edge computing node. In some embodiments, the system may extract, via the first edge computing node, a first configuration file associated with the first edge computing node. In response to determining a match of at least a portion of the first downstream request and the first configuration file associated with the first edge computing node, the system may extract first metadata associated with the first configuration file. Here, in some embodiments, the system may determine the downstream request based on determining an error in the available first source instance data associated with the first edge computing node at the downstream system. Here, the system may extract and analyze first metadata associated with the first configuration file of the first edge computing node to determine any errors, such as a mismatch between the extracted first metadata from the and the first technology application. The system may also determine whether the extracted first metadata is associated with modification to the first source instance data associated with the first edge computing node, or if the extracted metadata is not relevant to the modification to the first source instance data. Typically, in conventional systems, the process may fail at this step due to the incompatibility of the data from the first edge computing node with the technology application associated with the downstream request, due to the errors, and/or the data being out of date. However, the present invention solves this problem by the clustering described in FIGS. 3A-3B. The system invokes other cluster nodes for the requisite data such that the technology application can still be processes using relevant data from other cluster nodes, even though the downstream request was made for the first cluster node.

Next, at block 515, the system may determine at least one cluster edge computing node (e.g., similar to node 314c of FIG. 3A) associated with the first edge computing node (e.g., similar to node 314a of FIG. 3A), such that the first edge computing node and the at least one cluster edge computing node are associated with the same device cluster (e.g., similar to network device cluster 301 of FIG. 3A) of the of the plurality of edge computing nodes. In some embodiments, the system may determine the at least one cluster edge computing node associated with the first edge computing node in response to determining (i) the mismatch between the extracted first metadata and the first technology application, and/or determining that (ii) the extracted first metadata is not associated with modification to the first source instance data associated with the first edge computing node.

In some embodiments, to determine the at least one cluster edge computing node associated with the first edge computing node, the system may determine the device cluster (e.g., similar to network device cluster 301 of FIG. 3A) that the first edge computing node belongs to. Here, the first edge computing node (e.g., similar to node 314a of FIG. 3A) is one of the one or more first cluster edge computing nodes of that device cluster (e.g., similar to network device cluster 301 of FIG. 3A). In this regard, the system may identify other nodes of the cluster, i.e., one or more first cluster edge computing nodes of the plurality of edge computing nodes that are associated with the first device cluster. The system may then determine one or more of the one or more first cluster edge computing nodes (other than the first edge computing node or that are not the first edge computing) node as the at least one cluster edge computing node (e.g., similar to node 314c of FIG. 3A).

Next, at block 520, the system may extract at least one cluster configuration file associated with the at least one cluster edge computing node. The system may then analyze the at least one cluster configuration file associated with the at least one cluster edge computing node (e.g., similar to node 314c of FIG. 3A) to determine whether the configuration file associated with the at least one cluster edge computing node matches the downstream request and the associated input requirements to the technology application.

Block 525 illustrates an event where the system determines a partial match of at least a portion of the first downstream request and the at least one cluster configuration file associated with the at least one cluster edge computing node. Here, the system may only determine a partial match between at least one of a table, a view and/or a column associated with the first downstream request and the at least one cluster configuration file. In response, the system may determine a portion of the file that is relevant to the downstream request. As illustrated by block 530, the system may determine a related data component of the at least one cluster configuration file. Here, the system may determine a related data component of the at least one cluster configuration file based on analyzing the at least one cluster configuration file associated with the at least one cluster edge computing node.

Next, at block 535, the system may extract cluster metadata associated with the related data component. Here, the extracted cluster metadata is the metadata associated with the related data component of the at least one cluster configuration file.

Next, at block 540, the system may update the configuration file of the first edge computing node (e.g., similar to node 314a of FIG. 3A) by augmenting the first configuration file associated with the first edge computing node with the cluster metadata. The system may also update the configuration files of the other nodes in the cluster. The system may transmit, from the at least one cluster edge computing node (e.g., similar to node 314c of FIG. 3A), the cluster metadata associated with the at least one cluster configuration file to a third edge computing node (e.g., similar to node 314d of FIG. 3A) (or any other nodes) of the one or more first cluster edge computing nodes of the first device cluster. The system may then augment a third configuration file (or other configuration files of the other nodes in the cluster) associated with the third edge computing node (or any other nodes) with the cluster metadata associated with the at least one cluster configuration file associated with the at least one cluster edge computing node (e.g., similar to node 314c of FIG. 3A).

The system may also update the cluster configuration file of the associated cluster processor (e.g., similar to cluster processor 318 of FIG. 3A) at the cluster level. Here, the system may augment a first cluster processor configuration file associated with a first cluster processor device (e.g., similar to cluster processor 318 of FIG. 3A) of the one or more cluster processor devices operatively coupled to each of the one or more first cluster edge computing nodes of the first device cluster (e.g., similar to network device cluster 301 of FIG. 3A). Moreover, any modifications, or changes to the cluster configuration file at the cluster level are automatically reflected in that of the respective nodes. For instance, the system may augment configuration files associated with the first edge computing node, second edge computing node, third edge computing node, and/or the like, with the cluster metadata associated with the at least one cluster configuration file associated with the at least one cluster edge computing node.

Next, at block 545, the system may transform, via an extensible markup language (XML) connection device, the extracted cluster metadata associated with the at least one cluster edge computing node to application input data, such that application input data is compatible with the at least one downstream system. As discussed previously, typically, edge computing nodes, associated network device clusters, and/or cluster processor devices (318, 328) may contain source changes like object or columns level changes, reports and files in various technologies and associated metadata, which are incompatible for user processing of technology applications at downstream system(s) 395. To address this problem, the XML connection device 390 is structured to convert these object changes into an XML format (or another suitable format) to read/process the metadata information and provide recommendations for upstream data retrieval and changes.

Next, at block 550, the system may transmit the application input data to the at least one downstream system. Here, the system may transform, via the extensible markup language connection device (e.g., similar to XML connection device 390 of FIG. 3A), the extracted first metadata associated with the first edge computing node to the application input data, such that application input data is compatible with the at least one downstream system. Subsequently, at block 555, the system may process the first technology application at the at least one downstream system using the application input data. The system may then provide the output from processing the first technology application to a related user and/or to any other suitable systems.

In some embodiments, the system may operatively connect the source system/node and the downstream system when a match is not determined. Here, the system may receive a second downstream request from the at least one downstream system for determining a current modification to a second source instance data associated with a second edge computing node (e.g., edge computing node 326a of FIG. 3A). As discussed previously, the second edge computing node may be associated with the second device cluster (e.g., network device cluster 302 of FIG. 3A). In a manner similar to that described previously, the system may then determine at least one second cluster edge computing node (e.g., edge computing node 326b of FIG. 3A) associated with the second edge computing node, such that the at least one second cluster edge computing node is associated with the second device cluster (e.g., network device cluster 302 of FIG. 3A). The system may then extract at least one second cluster configuration file associated with the at least one second cluster edge computing node. In response to not determining a match of at least a portion of the second downstream request and the at least one second cluster configuration file associated with the at least one second cluster edge computing node, the system may operatively connect the at least one downstream system to the second edge computing node.

In some embodiments, the system my receive a third downstream request from the at least one downstream system for determining a current modification to the first source instance data associated with the first edge computing node. Here, the first edge computing node is associated with the first device cluster. In response to determining a match of at least a portion of the third downstream request and the at least one first cluster configuration file associated with the first edge computing node, the system may extract cluster processor metadata associated with a first cluster processor configuration file associated with a first cluster processor device of the one or more cluster processor devices operatively coupled to each of the one or more first cluster edge computing nodes of the first device cluster. The system may then transform, via an extensible markup language connection device, the extracted cluster processor metadata to additional application input data, such that additional application input data is compatible with the at least one downstream system. The system may then transmit the additional application input data to the at least one downstream system, and subsequently process the first technology application at the at least one downstream system using the additional application input data.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for dynamic processing of temporal upstream data and downstream data in communication networks, wherein the system is configured for dynamic processing and cascading of instance data and configuration files from edge node devices of a distributed network for reduction of latency in data transmissions, the system comprising:
an entity communication network comprising a plurality of network nodes, wherein the plurality of network nodes comprise a plurality of edge computing nodes, wherein each of the plurality of edge computing nodes are associated with dynamic instance data generated by an associated user;
one or more cluster processor devices;
at least one downstream system;
at least one memory device with computer-readable program code stored thereon;
at least one communication device;
at least one processing device operatively coupled to the at least one memory device and the at least one communication device, wherein executing the computer-readable code is configured to cause the at least one processing device to:
construct a first device cluster comprising one or more first cluster edge computing nodes of the plurality of edge computing nodes, wherein each of the one or more first cluster edge computing nodes are associated with first source instance data;
construct a second device cluster comprising one or more second cluster edge computing nodes of the plurality of edge computing nodes, wherein each of the one or more second cluster edge computing nodes are associated with second source instance data;
determine initiation of processing of a first technology application at the at least one downstream system, wherein the processing of the first technology application is associated with an input of first source instance data associated with a first edge computing node of the plurality of edge computing nodes;
receive a first downstream request for determining a current modification to the first source instance data associated with the first edge computing node;
determine at least one cluster edge computing node associated with the first edge computing node, such that the first edge computing node and the at least one cluster edge computing node are associated with the same device cluster of the plurality of edge computing nodes;
extract at least one cluster configuration file associated with the at least one cluster edge computing node;
in response to determining a match of at least a portion of the first downstream request and the at least one cluster configuration file associated with the at least one cluster edge computing node, extract cluster metadata associated with the at least one cluster configuration file associated with the at least one cluster edge computing node;
transform, via an extensible markup language connection device, the extracted cluster metadata associated with the at least one cluster edge computing node to application input data, such that application input data is compatible with the at least one downstream system;
transmit the application input data to the at least one downstream system;
process the first technology application at the at least one downstream system using the application input data;
extract, via the first edge computing node, a first configuration file associated with the first edge computing node;
in response to determining a match of at least a portion of the first downstream request and the first configuration file associated with the first edge computing node, extract first metadata associated with the first configuration file;
analyze the extracted first metadata associated with the first configuration file;
determine (i) a mismatch between the extracted first metadata and the first technology application, and/or determine that (ii) the extracted first metadata is not associated with modification to the first source instance data associated with the first edge computing node; and
determine the at least one cluster edge computing node associated with the first edge computing node in response to determining (i) the mismatch between the extracted first metadata and the first technology application, and/or determining that (ii) the extracted first metadata is not associated with modification to the first source instance data associated with the first edge computing node.

2. The system of claim 1, wherein constructing the first device cluster further comprises:
analyzing the source instance data associated with each of the plurality of edge computing nodes;
determining the one or more first cluster edge computing nodes of the plurality of edge computing nodes as the first device cluster, in response to determining that a match associated with at least a portion of source instance data associated with each of the plurality of edge computing nodes; and
assigning a first cluster processor device of the one or more cluster processor devices to the first device cluster such that the first cluster processor device is operatively coupled to each of the one or more first cluster edge computing nodes of the first device cluster.

3. The system of claim 1, wherein constructing the second device cluster further comprises:
analyzing the source instance data associated with each of the plurality of edge computing nodes;
determining the one or more second cluster edge computing nodes of the plurality of edge computing nodes as the second device cluster, in response to determining that a match associated with at least a portion of source instance data associated with each of the plurality of edge computing nodes; and
assigning a second cluster processor device of the one or more cluster processor devices to the second device cluster such that the second cluster processor device is operatively coupled to each of the one or more second cluster edge computing nodes of the second device cluster.

4. The system of claim 1, wherein determining the at least one cluster edge computing node associated with the first edge computing node further comprises:
determining that the first edge computing node is associated with the first device cluster, wherein the first edge computing node is one of the one or more first cluster edge computing nodes;

determining the one or more first cluster edge computing nodes of the plurality of edge computing nodes associated with the first device cluster; and determining one or more of the one or more first cluster edge computing nodes that are not the first edge computing node as the at least one cluster edge computing node.

5. The system of claim 1, wherein executing the computer-readable code is configured to further cause the at least one processing device to transform, via the extensible markup language connection device, the extracted first metadata associated with the first edge computing node to the application input data.

6. The system of claim 1, wherein executing the computer-readable code is configured to further cause the at least one processing device to:

transmit, from the at least one cluster edge computing node, the cluster metadata associated with the at least one cluster configuration file to the first edge computing node; and augment, via the first edge computing node, a first configuration file associated with the first edge computing node with the cluster metadata associated with the at least one cluster configuration file associated with the at least one cluster edge computing node.

7. The system of claim 1, wherein the first edge computing node is one of the one or more first cluster edge computing nodes of the first device cluster, wherein the at least one cluster edge computing node is one or more of the one or more first cluster edge computing nodes of the first device cluster, wherein executing the computer-readable code is configured to further cause the at least one processing device to:

transmit, from the at least one cluster edge computing node, the cluster metadata associated with the at least one cluster configuration file to a third edge computing node of the one or more first cluster edge computing nodes of the first device cluster; and augment, via the first edge computing node, a third configuration file associated with the third edge computing node with the cluster metadata associated with the at least one cluster configuration file associated with the at least one cluster edge computing node.

8. The system of claim 1, wherein determining the match of at least a portion of the first downstream request and the at least one cluster configuration file further comprises determining the match between at least one of a table, a view and/or a column associated with the first downstream request and the at least one cluster configuration file.

9. The system of claim 1, wherein determining the match of at least a portion of the first downstream request and the at least one cluster configuration file further comprises determining a partial match between at least one of a table, a view and/or a column associated with the first downstream request and the at least one cluster configuration file, wherein executing the computer-readable code is configured to further cause the at least one processing device to:

determine a related data component of the at least one cluster configuration file based on analyzing the at least one cluster configuration file associated with the at least one cluster edge computing node;

wherein the extracted cluster metadata is associated with the related data component of the at least one cluster configuration file.

10. The system of claim 1, wherein the first edge computing node is one of the one or more first cluster edge computing nodes of the first device cluster, wherein the at least one cluster edge computing node is one or more of the one or more first cluster edge computing nodes of the first device cluster, wherein executing the computer-readable code is configured to further cause the at least one processing device to augment, a first cluster processor configuration file associated with a first cluster processor device of the one or more cluster processor devices operatively coupled to each of the one or more first cluster edge computing nodes of the first device cluster.

11. The system of claim 1, wherein executing the computer-readable code is configured to further cause the at least one processing device to:

receive a second downstream request from the at least one downstream system for determining a current modification to a second source instance data associated with a second edge computing node, wherein the second edge computing node is associated with the second device cluster;

determine at least one second cluster edge computing node associated with the second edge computing node, wherein the at least one second cluster edge computing node is associated with the second device cluster;

extract at least one second cluster configuration file associated with the at least one second cluster edge computing node; and in response to not determining a match of at least a portion of the second downstream request and the at least one second cluster configuration file associated with the at least one second cluster edge computing node, operatively connect the at least one downstream system to the second edge computing node.

12. The system of claim 1, wherein executing the computer-readable code is configured to further cause the at least one processing device to:

receive a third downstream request from the at least one downstream system for determining a current modification to the first source instance data associated with the first edge computing node, wherein the first edge computing node is associated with the first device cluster;

in response to determining a match of at least a portion of the third downstream request and at least one first cluster configuration file associated with the first edge computing node, extract cluster processor metadata associated with a first cluster processor configuration file associated with a first cluster processor device of the one or more cluster processor devices operatively coupled to each of the one or more first cluster edge computing nodes of the first device cluster;

transform, via an extensible markup language connection device, the extracted cluster processor metadata to additional application input data, such that additional application input data is compatible with the at least one downstream system;

transmit the additional application input data to the at least one downstream system; and process the first technology application at the at least one downstream system using the additional application input data.

13. A computer program product for dynamic processing of temporal upstream data and downstream data in communication networks, wherein the computer program product is configured for dynamic processing and cascading of instance data and configuration files from edge node devices of a distributed network for reduction of latency in data transmissions, the computer program product comprising a non-transitory computer-readable storage medium having computer-executable instructions to:

construct a first device cluster comprising one or more first cluster edge computing nodes of a plurality of edge computing nodes, wherein each of the one or more first cluster edge computing nodes are associated with first source instance data;

construct a second device cluster comprising one or more second cluster edge computing nodes of the plurality of edge computing nodes, wherein each of the one or more second cluster edge computing nodes are associated with second source instance data;

determine initiation of processing of a first technology application at, at least one downstream system, wherein the processing of the first technology application is associated with an input of first source instance data associated with a first edge computing node of the plurality of edge computing nodes;

receive a first downstream request for determining a current modification to the first source instance data associated with the first edge computing node;

determine at least one cluster edge computing node associated with the first edge computing node, such that the first edge computing node and the at least one cluster edge computing node are associated with the same device cluster of the of the plurality of edge computing nodes;

extract at least one cluster configuration file associated with the at least one cluster edge computing node;

in response to determining a match of at least a portion of the first downstream request and the at least one cluster configuration file associated with the at least one cluster edge computing node, extract cluster metadata associated with the at least one cluster configuration file associated with the at least one cluster edge computing node;

transform, via an extensible markup language connection device, the extracted cluster metadata associated with the at least one cluster edge computing node to application input data, such that application input data is compatible with the at least one downstream system;

transmit the application input data to the at least one downstream system;

process the first technology application at the at least one downstream system using the application input data;

extract, via the first edge computing node, a first configuration file associated with the first edge computing node;

in response to determining a match of at least a portion of the first downstream request and the first configuration file associated with the first edge computing node, extract first metadata associated with the first configuration file;

analyze the extracted first metadata associated with the first configuration file;

determine (i) a mismatch between the extracted first metadata and the first technology application, and/or determine that (ii) the extracted first metadata is not associated with modification to the first source instance data associated with the first edge computing node; and determine the at least one cluster edge computing node associated with the first edge computing node in response to determining (i) the mismatch between the extracted first metadata and the first technology application, and/or determining that (ii) the extracted first metadata is not associated with modification to the first source instance data associated with the first edge computing node.

14. The computer program product of claim 13, wherein the non-transitory computer-readable storage medium further comprises computer-executable instructions to:

transmit, from the at least one cluster edge computing node, the cluster metadata associated with the at least one cluster configuration file to the first edge computing node; and augment, via the first edge computing node, a first configuration file associated with the first edge computing node with the cluster metadata associated with the at least one cluster configuration file associated with the at least one cluster edge computing node.

15. The computer program product of claim 13, wherein the first edge computing node is one of the one or more first cluster edge computing nodes of the first device cluster, wherein the at least one cluster edge computing node is one or more of the one or more first cluster edge computing nodes of the first device cluster, wherein the non-transitory computer-readable storage medium further comprises computer-executable instructions to:

transmit, from the at least one cluster edge computing node, the cluster metadata associated with the at least one cluster configuration file to a third edge computing node of the one or more first cluster edge computing nodes of the first device cluster; and augment, via the first edge computing node, a third configuration file associated with the third edge computing node with the cluster metadata associated with the at least one cluster configuration file associated with the at least one cluster edge computing node.

16. The computer program product of claim 13, wherein determining the match of at least a portion of the first downstream request and the at least one cluster configuration file further comprises determining a partial match between at least one of a table, a view and/or a column associated with the first downstream request and the at least one cluster configuration file, wherein the non-transitory computer-readable storage medium further comprises computer-executable instructions to:

determine a related data component of the at least one cluster configuration file based on analyzing the at least one cluster configuration file associated with the at least one cluster edge computing node;

wherein the extracted cluster metadata is associated with the related data component of the at least one cluster configuration file.

17. A computer implemented method for dynamic processing of temporal upstream data and downstream data in communication networks, wherein the computer implemented method is configured for dynamic processing and cascading of instance data and configuration files from edge node devices of a distributed network for reduction of latency in data transmissions, the computer implemented method comprising:

constructing a first device cluster comprising one or more first cluster edge computing nodes of a plurality of edge computing nodes, wherein each of the one or more first cluster edge computing nodes are associated with first source instance data;

constructing a second device cluster comprising one or more second cluster edge computing nodes of the plurality of edge computing nodes, wherein each of the one or more second cluster edge computing nodes are associated with second source instance data;

determining initiation of processing of a first technology application at, at least one downstream system, wherein the processing of the first technology application is associated with an input of first source instance data associated with a first edge computing node of the plurality of edge computing nodes;

receiving a first downstream request for determining a current modification to the first source instance data associated with the first edge computing node;

determining at least one cluster edge computing node associated with the first edge computing node, such that the first edge computing node and the at least one cluster edge computing node are associated with the same device cluster of the of the plurality of edge computing nodes;

extracting at least one cluster configuration file associated with the at least one cluster edge computing node;

in response to determining a match of at least a portion of the first downstream request and the at least one cluster configuration file associated with the at least one cluster edge computing node, extracting cluster metadata associated with the at least one cluster configuration file associated with the at least one cluster edge computing node;

transforming, via an extensible markup language connection device, the extracted cluster metadata associated with the at least one cluster edge computing node to application input data, such that application input data is compatible with the at least one downstream system;

transmitting the application input data to the at least one downstream system;

processing the first technology application at the at least one downstream system using the application input data;

extracting, via the first edge computing node, a first configuration file associated with the first edge computing node;

in response to determining a match of at least a portion of the first downstream request and the first configuration file associated with the first edge computing node, extracting first metadata associated with the first configuration file;

analyzing the extracted first metadata associated with the first configuration file;

determining (i) a mismatch between the extracted first metadata and the first technology application, and/or determine that (ii) the extracted first metadata is not associated with modification to the first source instance data associated with the first edge computing node; and determining the at least one cluster edge computing node associated with the first edge computing node in response to determining (i) the mismatch between the extracted first metadata and the first technology application, and/or determining that (ii) the extracted first metadata is not associated with modification to the first source instance data associated with the first edge computing node.

18. The computer implemented method of claim 17, wherein the computer implemented method further comprises:

transmitting, from the at least one cluster edge computing node, the cluster metadata associated with the at least one cluster configuration file to the first edge computing node; and augmenting, via the first edge computing node, a first configuration file associated with the first edge computing node with the cluster metadata associated with the at least one cluster configuration file associated with the at least one cluster edge computing node.

\* \* \* \* \*